(12) United States Patent
Brown

(10) Patent No.: US 7,795,756 B2
(45) Date of Patent: Sep. 14, 2010

(54) PORTABLE GENERATOR INTERCONNECTION DEVICE FOR TRAFFIC SIGNAL

(76) Inventor: George F. Brown, 411 N. 72nd Way, Hollywood, FL (US) 33024

( * ) Notice: Subject to any disclaimer, the term of this patent is extended or adjusted under 35 U.S.C. 154(b) by 235 days.

(21) Appl. No.: 12/202,910

(22) Filed: Sep. 2, 2008

(65) Prior Publication Data

US 2009/0058186 A1 Mar. 5, 2009

Related U.S. Application Data

(60) Provisional application No. 60/969,099, filed on Aug. 30, 2007.

(51) Int. Cl.
*H02J 7/00* (2006.01)
*H02J 9/00* (2006.01)
(52) U.S. Cl. .......................... 307/64; 307/126
(58) Field of Classification Search ................ 307/64, 307/125, 126; 340/907, 908
See application file for complete search history.

(56) References Cited

U.S. PATENT DOCUMENTS

| 3,034,098 | A | 5/1962 | Clasen |
| 3,629,600 | A | 12/1971 | Stuler |
| 6,094,130 | A | 7/2000 | Uischner |
| 2004/0070518 | A1 | 4/2004 | Whittle, Jr. et al. |
| 2007/0008177 | A1 | 1/2007 | Schnackenberg |
| 2007/0126599 | A1 | 6/2007 | Gembala et al. |

*Primary Examiner*—Jared J Fureman
*Assistant Examiner*—Carlos Amaya
(74) *Attorney, Agent, or Firm*—Michael C. Cesarano; Feldman Gale, P.A.

(57) ABSTRACT

When utility power has been lost at a controlled traffic intersection, an emergency interconnection circuit having no internal power of its own provides emergency electrical power to the traffic light controller by means of a portable generator. A maintenance technician can provide a portable generator and cord that plugs in to the emergency interconnection circuit. Upon throwing an internal switch, the interconnection circuit provides emergency generator power to operate the traffic light until utility power has been restored.

3 Claims, 3 Drawing Sheets

PORTABLE GENERATOR INTERCONNECTION DEVICE FOR TRAFFIC SIGNAL

CROSS-REFERENCE TO RELATED APPLICATIONS

The present application claims priority benefit under 35 U.S.C. §119(e) of U.S. Provisional Patent Application Ser. No. 60/969,099 filed Aug. 30, 2007. The disclosure this application is incorporated herein by reference.

BACKGROUND

Currently outages caused by storms of other natural causes, greatly impact the motor vehicle community. Vehicle travel on congested roads can be very chaotic when hindered by traffic signal outages. Local police officers, state troopers and service personnel are often called upon to aid and render assistance under inclement weather and other conditions causing power outages, thereby precluding law enforcement officials from performing other normal emergency tasks and activities, and creating conditions in which public safety may be compromised. The present invention, a portable generator interconnection device ("interconnection device"), avoids such hazards.

SUMMARY OF INVENTION

The interconnection device of this invention is designed to provide power to the controller of a signalized intersection via a portable generator equipped with a Department of Transportation approved receptacle. The interconnection device will safely inter-phase utility and emergency power automatically and instantaneously to traffic control devices. During an outage the interconnection device will be switched to emergency mode, allowing the end user to attach a generator via its built in outlet, and to restore power to the controller. When utility power is restored, the interconnection device will automatically and instantaneously switch itself back to normal mode, thus safely dropping the generator from the circuit. If further power outages should occur while the generator remains connected and running, the switch back to generator power for the traffic device is automatic and instantaneous. The unit is equipped with conspicuous pilot lights, which indicate to the end user which power sources are available and under which mode the interconnection device is operating. The pilot lights may consist of one to indicate utility power (green) and another to indicate generator power (red). A third light may be utilized in an embodiment using test circuitry.

The interconnection device is also equipped with an internal overload and ground fault protection thru a KTK type fuse. The class of the fuse can be modified to accommodate various types of environments under which the interconnection device will be installed. A key switch may also be used with the interconnection device. This will allow the end user to safely and conveniently plug the generator into the interconnection device and start the unit with no load imposed.

Currently, a traffic signal device consists of a power supply from a utility company, a controller cabinet and the actual traffic light. Utility power is connected to the controller cabinet allowing the controller cabinet to provide the proper program and power to operate the traffic light. With the interconnection device installed, the controller cabinet can receive power from either the utility company or from another source (i.e. generator)

The interconnection device functions similarly to a transfer switch, yet has components not present in a transfer switch, and which are intended to operate under conditions in which power is to be restored to a traffic control device. Unlike a transfer switch, the interconnection device of this invention lacks the voltage sensing relays and start-up mechanism found on transfer switches. The interconnection device is not intended or designed to be used with permanently installed generators, but is a switching device that interconnects two alternate and separate sources of power to a traffic light via a cord (a male plug and a female receptacle) where one source is an outside power source, such as a portable generator. The interconnection device supplies no power of its own, contains no inverters or chargers, has no batteries to store, and lacks any mechanism to excite a prime mover.

During an outage, the maintenance operator will connect a cord to a portable generator. The operator may then proceed to plug the cord from the generator into the interconnection device outlet, at this time the operator should verify that the generator key switch is in the "off" position. The operator may then safely start the generator and bring it up to running speed. The operator may then turn the generator key switch "on" thus enabling the energy from the generator to flow to the controller of the traffic light and restore it to its normal operating mode. The red pilot light, (emergency power), will now be lit. When utility power is restored, the green pilot light will be lit, (at this point both pilot lights will be lit), indicating to the end user that it is now safe to turn the generator key switch off and discontinue using the generator, at which point the red pilot light will go out. The cord may then be unplugged from the generator and the interconnection device, and the generator may be removed for storage

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF PREFERRED EMBODIMENT

Normal Utility Operation

Figure 1:
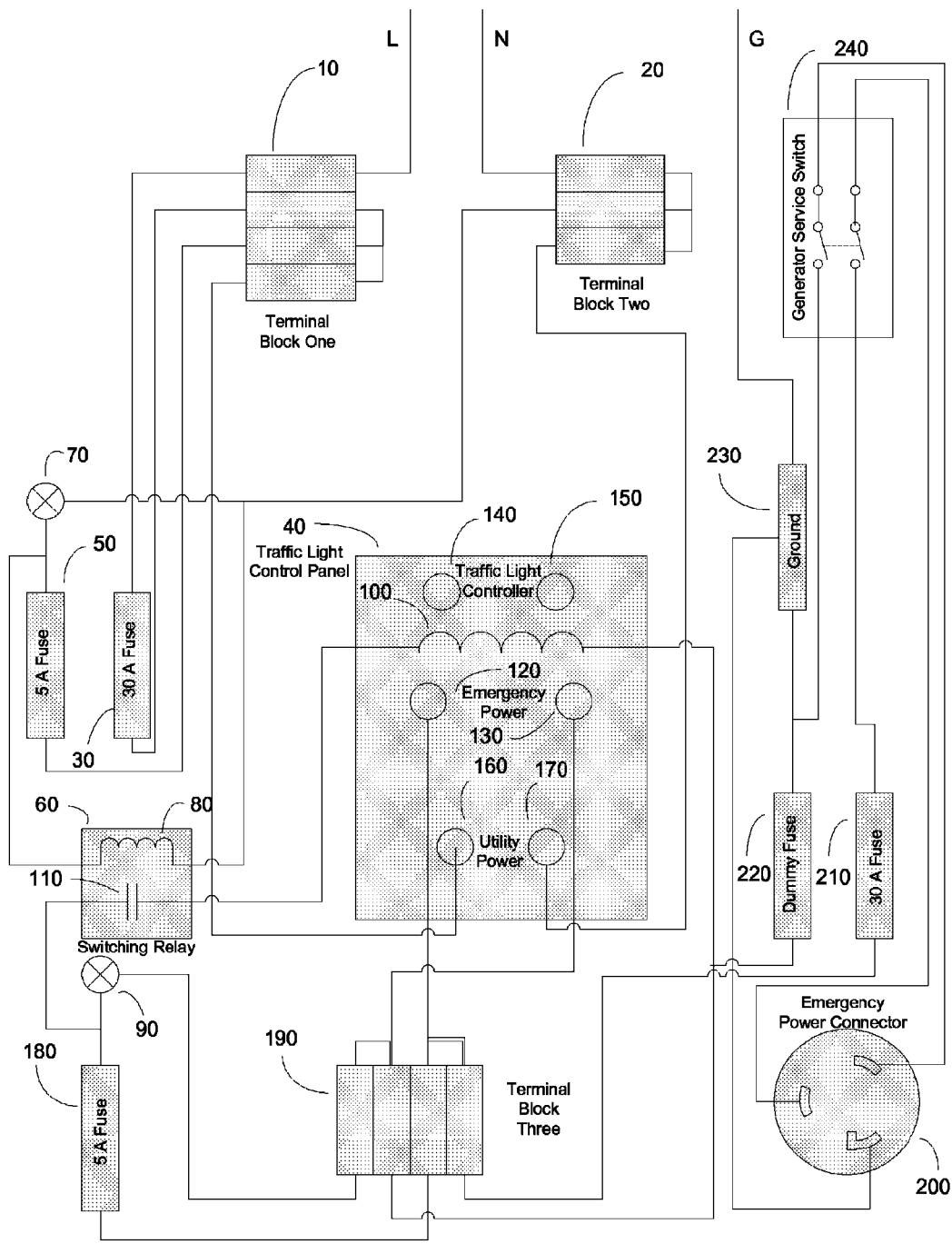
FIG. 1 is a schematic diagram illustrating a passive unit in accordance with the preferred embodiment.

The interconnection device unit has preferred three modes, or embodiments, for normal operation. In FIG. 1, utility power (labeled "L" and "N") enters the unit via terminal block one 10 and terminal block two 20. Utility power is then routed thru the unit main utility fuse block 30, which may be a 30 amp fuse. Utility power is then returned to terminal block one 10, where it is then distributed to the control circuit panel 40, through fuse 50, which may be a 5 amp fuse. The control circuit includes a switching relay 60 and a green pilot light 70 which indicates that utility 120 VAC electrical power is present. Under a normal utility operating condition, power flows thru control fuse 50, through the operating coil 80 of switching relay 60, and green indicating light 70, causing a normally set of closed dry contacts 110 (no voltage of their own) to open. This will serve as an electrical interlocking mechanism isolating power relay coil 100 from any incidental degree of energizing. Simultaneously, power flows from terminal block one 10, to a set of normally closed dry switching contacts of power relay 160 and 170. From the dry set of normally closed switching contacts, power will flow from utility power terminal 160 and 170 to the load being served 140 and 150, which is the controller for the Traffic Signal.

Test Lamp Unit

Figure 2:
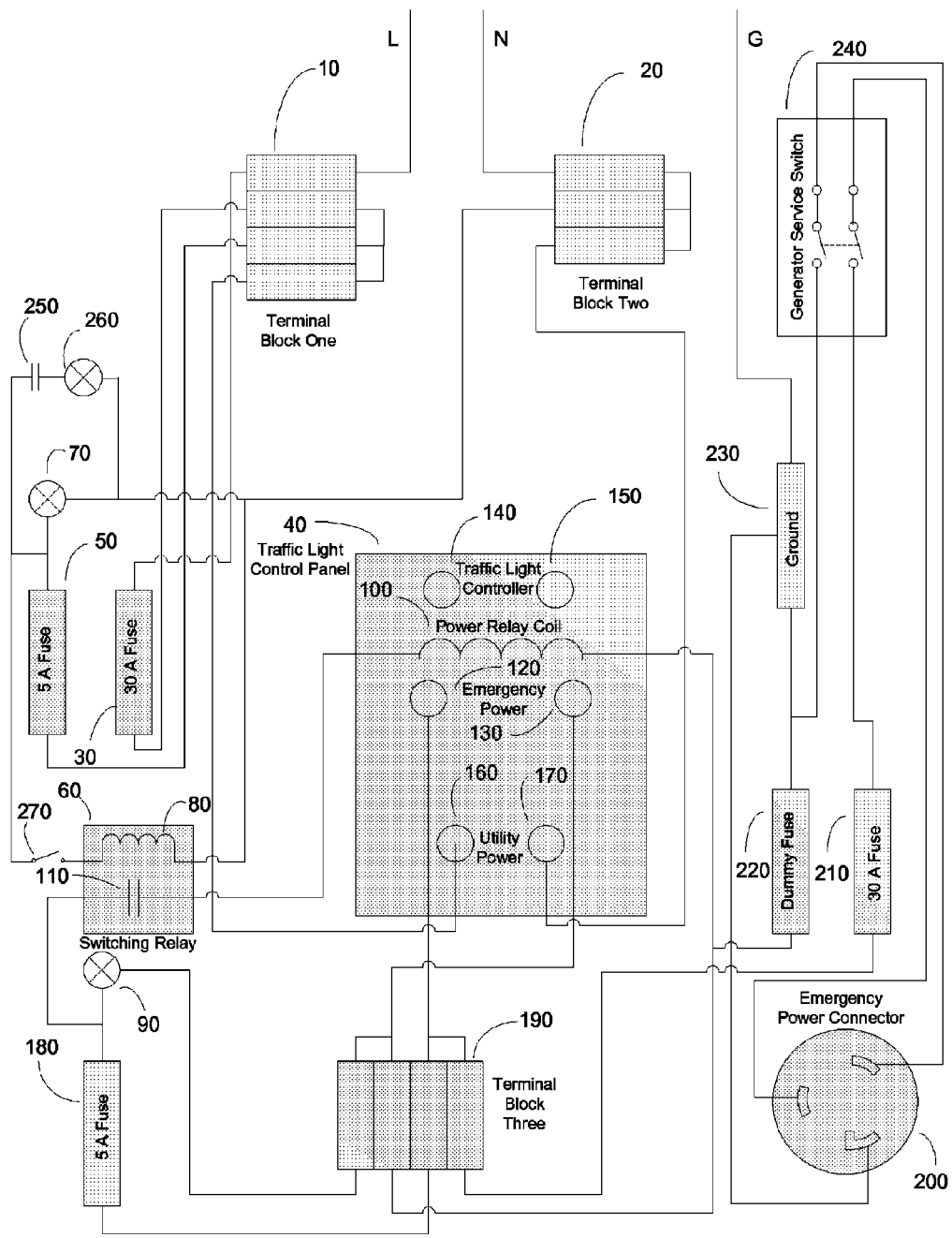
FIG. 2 is a schematic diagram illustrating a test lamp unit in accordance with the preferred embodiment.

As shown in FIG. 2, on units equipped with a test switch 270 and a test light 260, a maintenance operator can activate (open) the spring loaded momentary contact switch 270. This action will momentarily de-energize the operating coil 80 of the switching relay 60, causing a dry set of normally open contacts 250 to close, energizing test light 260. This option will be useful for maintenance personnel monitoring and verifying the operation of the switching relay coil. In the event that switching relay 60 should become defective or develop some form of failure, the unit will continue to function and operate normally while switching relay 60 remains in its socket. If switching relay 60 is removed, it will disable the emergency function of the unit in the emergency mode. If the unit is operating in the normal (utility) mode, switching relay 60 can be safely removed from its socket and replaced without interfering with the unit normal operation.

Proactive Unit

Figure 3:
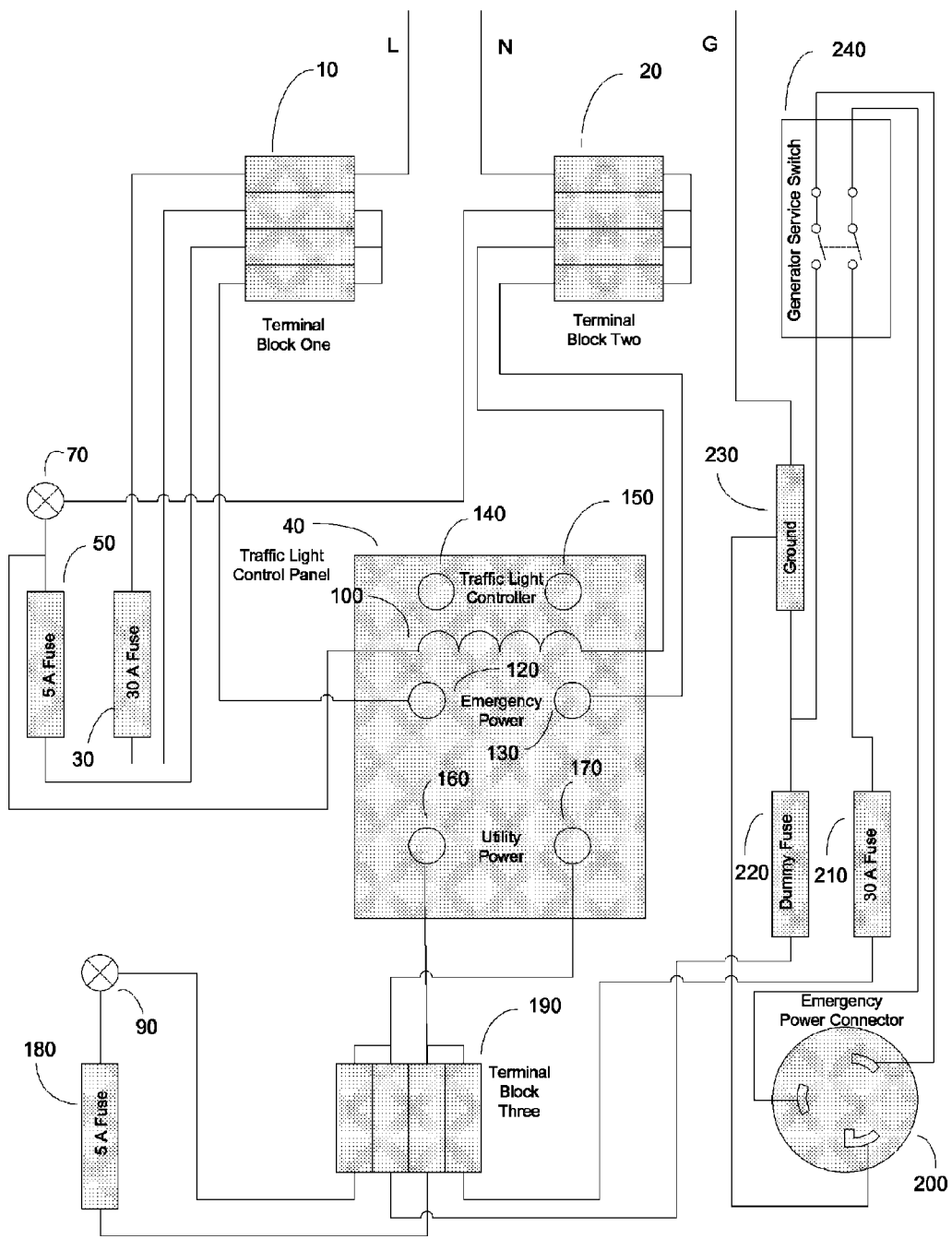
FIG. 3 is a schematic diagram illustrating a proactive unit in accordance with the preferred embodiment.

As shown in FIG. 3, on proactive units which are neither equipped with a switching relay (60 in FIG. 1, not present in FIG. 3), or a test switch 270 with test light 260 (not present in FIG. 3), the utility power directly activates the coil 100 of control panel 40, causing the normally open dry set of contacts 160 and 170 to close, completing the circuit with traffic light controller contacts 140 and 150 in the controller cabinet of the Traffic Signal.

Emergency Mode Operation

When an outage or power failure occurs the green indicator light 70 will go out and the switching relay coil 80 will de-energize. This will cause the normally dry set of closed contacts 110, which were held open while the coil was energized, to close. The unit is now ready to operate in the "Emergency" mode. A thirty ampere cord (minimum) may then be connected to the unit's emergency power connector 200. The operator must then verify that the interconnection device unit key switch 240 must be in the "off" position. This will prevent the generator from starting under load, which may create dangerous and adverse conditions. The operator can now safely start the generator and bring it up to the recommended running speed as suggested by its manufacturer. The operator may now proceed to turn the key switch 240 to "on." Once the switch is turned on, power will flow from the switch 240, to the emergency power fuse 210, which may be a 30 amp fuse. The unit is also equipped with a main bonding jumper to be used should the need be warranted. Power will flow from emergency fuse 210, to terminal block three 190. From terminal block three 190, power is distributed to the emergency control circuit which includes the includes emergency fuse 180, the operating coil of the power relay 100, the red indicating light 90 and the normally open set of dry contacts 110 of switching relay 60. As detailed earlier, once the key switch 240 is "on," the red indicating light 90 will turn on, indicating the presence of 120 VAC from the portable generator. Simultaneously, power will flow from terminal block three 190 to the normally closed set of dry contacts 110 of the switching relay 60, which will then energize the operating coil of the power relay 100, causing the power relay normally open dry set of contacts 120 and 130 to close, energizing the controller for the traffic signal through contacts 140 and 150.

Utility Power Restoration

Once utility power is restored, switching relay coil 80 will energize, causing the normally closed dry set of contacts 110 to open. This de-energizes the operating coil of the power relay 100, which will now cause the power relay normally open dry set of contacts 120 and 130 to re-open, effectively dropping the emergency circuit out of operation and restoring the unit to normal utility operation. At this point, the operator will see both indicating lights 70 and 90 operating. It is recommended that the operator first turn the interconnection device main key switch 240 to the "off" position, followed by then turning off the generator.

What is claimed is:

1. An circuit for switching between a utility power source and an emergency power source for a traffic light controller during failure and restoration of the permanent power source, comprising:

a traffic light controller, a control panel, said control panel further comprising traffic light controller contacts, utility power contacts, emergency power contacts, and a power relay coil, said traffic light controller contacts being connected to said utility power contacts during normal operation and said traffic light controller contacts being connected to said emergency power contacts upon the energizing of said power relay coil during emergency operation, a switching relay, said switching relay further comprising a switching relay coil and switching relay contacts, said switching relay contacts being responsive to the energizing of said switching relay coil, said switching relay coil being de-energized during normal operation and said switching relay contacts being open during normal operation, said switching relay coil becoming energized during emergency operation and said switching relay contacts being closed during emergency operation, an emergency power connector, said emergency power connector being attachable to an emergency power source, a generator service switch, said generator switch connecting said emergency power connector to said switching relay and said power relay coil, said generator switch being open during normal operation, whereby when said generator service switch is open, said switching relay coil and said power relay coil are open and utility power is sent to said traffic light controller, and when said generator service switch is closed, said switching relay coil and said power relay coil are open and power from said emergency power connector is sent to said traffic light controller.

2. The circuit claimed in claim 1, further comprising a pilot light and an emergency light, said pilot light being illuminated when utility power is present in said circuit and said emergency light being illuminated when emergency power is present in said circuit and said generator service switch is closed.

3. The circuit claimed in claim 2, further comprising a test circuit, said test circuit comprising a set of normally open contacts connected to a test light, and a normally closed spring loaded momentary contact switch, said momentary contact switch being connected to said switching relay coil, whereby upon opening said momentary contact switch, said switching relay coil becomes isolated from said emergency power source, said normally open contacts close, and said test light illuminates.

* * * * *